United States Patent
Sugata

[11] Patent Number: 5,791,842
[45] Date of Patent: Aug. 11, 1998

[54] CHIP SUCTION AND DISPOSAL DEVICE FOR A MACHINE TOOL HAVING AN AUTOMATIC TOOL EXCHANGING STRUCTURE

[75] Inventor: Shinsuke Sugata, Hiroshima-ken, Japan

[73] Assignee: Horkos Corp., Hiroshima-ken, Japan

[21] Appl. No.: 666,371

[22] PCT Filed: Dec. 28, 1994

[86] PCT No.: PCT/JP94/02305

§ 371 Date: Jun. 27, 1996

§ 102(e) Date: Jun. 27, 1996

[87] PCT Pub. No.: WO95/17992

PCT Pub. Date: Jul. 6, 1995

[30] Foreign Application Priority Data

Dec. 30, 1993 [JP] Japan .................. 5-077682 U
Oct. 22, 1994 [JP] Japan .................. 6-014744 U

[51] Int. Cl.$^6$ .................. B23C 9/00; B23Q 11/00
[52] U.S. Cl. .................. 409/137; 408/61
[58] Field of Search .................. 483/13, 32; 409/136, 409/137, 134, 135; 408/56, 59, 61, 241 G, 241 R

[56] References Cited

U.S. PATENT DOCUMENTS 4,563,115 1/1986 Abe et al. .................. 409/134
5,090,849 2/1992 Arai et al. .................. 409/137

FOREIGN PATENT DOCUMENTS 5-21376 of 1988 Japan .
4-112725 of 1992 Japan .
4-115518 of 1992 Japan .
4-83607 of 1992 Japan .

*Primary Examiner*—William R. Briggs
*Attorney, Agent, or Firm*—Lane, Aitken & McCann

[57] ABSTRACT

A chip disposal device used in a machine tool for continuously expelling chips produced from a cutting tool such as a drill to another place, while a work is being processed with the tool. In this device, a hooding means (13) is slidably provided relative to a work (w) for forming an air-tight space around a cutting tool (11) such as a drill which is mounted on a spindle (3) of the machine tool by means of a cutting tool mounting member, and an air suction pipe (15) is provided for sucking the air from the space inside the hood. In addition, an air hole (11a) is formed in the shaft of the cutting tool (11) in such a manner that it is open at the tip end of the cutting tool at one end and at the other end is caused to communicate with passageways (p1, p2) open to the atmospheric area. In this case, the air hole (11a) may be connected to a compressed air supply pipe (33) at the other end instead of being open to the atmospheric area. Furthermore, a cutting agent may be mixed into the air supplied from the compressed air supply pipe (33).

10 Claims, 4 Drawing Sheets

5,791,842

1

CHIP SUCTION AND DISPOSAL DEVICE FOR A MACHINE TOOL HAVING AN AUTOMATIC TOOL EXCHANGING STRUCTURE

FIELD OF THE INVENTION

The present invention relates to a chip suction and disposal device for a machine tool having an automatic tool exchanging structure, wherein chips produced from a cutting tool such as a drill can be continuously attracted and removed during processing a work with the tool.

BACKGROUND OF THE INVENTION

For a machine tool having a rotatable shaving tool or boring cutter, there has been a chip attracting device for immediately and continuously attracting and removing chips produced during processing a work by means of air stream (see Japanese Utility Model Provisional Publication No. 104915 of 1990).

This chip attracting device can prevent the working environment from being aggravated by scattered chips, save a person's trouble of cleaning chips, as well as prevent precision of a work from being degraded by distortions of a work due to the heat of the chips.

A machine tool having an automatic tool exchaning structure also requires that chips produced during processing a work with a cutting tool such as a drill, reamer, or tap should be removed without a person's trouble.

A cutting tool such as a drill, however, produces chips at a relatively deep position of a work. Therefore, the conventional chip attracting device can hardly meet the above requirement. It is especially true for a work made of aluminum.

Therefore, objects of the present invention are to overcome the above problem, and to provide a chip suction and disposal device for a machine tool, wherein chips produced from a cutting tool such as a drill can be immediately and continuously removed by means of air stream without losing a function for exchaning a cutting tool.

SUMMARY OF THE INVENTION

This invention is characterized by a chip suction and disposal device for a machine tool having an automatic tool exchanging structure, wherein a cutting tool subassembly (U) is fit to and removed from a spindle; wherein a hooding means (13) is provided to form an air-tight space around a cutting tool mounted on the tip end of a cutting tool mounting member (7); wherein cylindrincal members (16, 19), parts of the hooding member, are retreatable and slidable relative to a work against spring (18) force toward the tip end of the cutting tool; wherein an opening is provided on the tip end face of the cylindrical members, said tip end to be in touch with the work; wherein air ducts (s1, s2) are provided to suck the air inside the hooding means; wherein an air hole (11a) is provided in a shaft of the cutting tool; wherein one end of the air hole is open to the tip end of the cutting tool, while the other end is connected to passages (p1, p2), said passages being open to the atomospheric area at the cutting tool mounting member (7); wherein a connecting opening for said air ducts (s1, s2) is provided on the end face of the hooding means on its spindle side; wherein an engaging means (26) is provided to regulate rotations of the cutting tool mounting member (7) to a fixed position; wherein said engaging means (26) is provided to protrude by means of a bar member (28) which is engaged

2 with the spindle supporting member (1) in a same body; wherein rotating regulation of the cutting tool mounting member (7) is released by pushing movement of the bar member (28) against spring (27) force; and wherein an air suction pipe (15) is provided near the spindle supporting member (1) so as to closely connect the end face of a connecting opening of said air suction pipe (15) with the end face of the above connecting opening of the air ducts (s1, s2).

According to this invention, the cutting tool subassembly is suitably held and moved by a cutting tool exchanging arm of an automatic cutting tool exchanging machine so as to be mounted to or removed from the spindle.

When mounting the cutting tool subassembly, the cutting tool mounting member is properly moved to a fixed position on the spindle because of interaction between the engaging means and orientation function of the spindle. While the cutting tool subassembly is mounted, the bar member is engaged with the spindle supporting member so that rotating movement of the hooding means in a rotating direction of the cutting tool is regulated. Besides, after related movement of later-described members, the cutting tool subassembly is put into operation.

When removing the cutting tool subassembly, the cutting tool mounting member is removed from the spindle in a fixed relative arrangement because of interaction between the engaging means and orientation function of the spindle. After being removed, a rotating direction of the cutting tool subassembly is regulated at a fixed position with the engaging means.

During processing with the cutting tool, the air is sucked from the air suction pipe and the air holes into the air-tight space. Because of the sucking force, the air flows into the air-tight space from the tip opening of the cutting tool through the passage of the cutting tool mounting member and the air hole of the cutting tool. At this time,the air flow blows chips into the air-tight space as soon as they are produced at the tip end of the cutting tool. Then, the chips are carried to another place through the air flowing in the air hole. Besides, the air flowing in the air hole of the cutting tool takes the heat produced during processing with the cutting tool, thereby cooling the cutting tool.

Most of the structures in the second invention are the same as disclosed in the first invention, but the structure in the first invention "one end of the air hole is open to the tip end of the cutting tool, while the other end is connected to passages, said passages being open to the atomospheric area at the cutting tool mounting member" is changed as follows. Namely, one end of the air hole is open to the tip end of the cutting tool, while the other end is connected to an outer air compressed supply pipe by means of a passage provided on the cutting tool mounting member.

Besides, the engaging means (26) comprises a bar member (28) which is in an axtial direction of the spindle supporting member (1), independently provided on the end face of the hooding means on its spindle side at a position nearer the cutting tool mounting member (7) than the center line of the air duct (s2), and which is given the pushing force for individual movement by a spring (27) provided inside.

In this second invention, during processing the work, the compressed air supplied from the compressed air pipe reaches the air hole of the cutting tool through the passage of the cutting tool mounting member, and jets from the tip opening thereof intensively. This compressed air becomes strong air flow having a direction in relation with the sucking force of the air suction pipe so as to carry the chips produced at the tip end of the cutting tool into the hood immediately and actively. Thus carried chips are delivered to another place through the air suction pipe with the air.

Besides, the compressed air cools the heated tip end of the cutting tool powerfully with its strong flow, thereby effectively preventing abrasion and heat deformation of the cutting tool.

In the engaging means (26) according to this invention, the bar member (28) is separately provided to be in an axtial direction of the spindle supporting member (1) and to be independently removable by the bounding force of the spring. In such a structure, the outer force affecting the engaging means (26) has no influence on the related members such as the air duct (s2) and the air suction pipe (15), thereby completely preventing their engaging or sliding parts from clogging with the chips.

In the second invention, it is preferable that a cutting fluid supply device may be provided for feeding misty cutting fluid into the compressed air in the air hole supplied from the compressed air supply pipe. According to this, the cutting fluid lubricate the cutting tool without preventing the flow of the compressed air, thereby restraining the cutting tool from being abraded or deformed due to the heat more effectively.

Moreover, in the first and second inventions, the cylindrical members (16 and 19) are made of a rigid materical such as metal. Accordingly, the hooding means, which receives relatively strong outer force during processing, can increase its strength and be operated without any difficulty.

Furthermore, it is preferable that a notch or through hole instead thereof may be provided on the tip end face of the inner cylindrical member (19). With this structure, even when the air flow into the hood from the air hole of the cutting tool is insufficient, the through hole or notch enables the air inflow into the hood to supplement the air therein.

PREFERRED EMBODIMENTS OF THE PRESENT INVENTION

Figure 1:
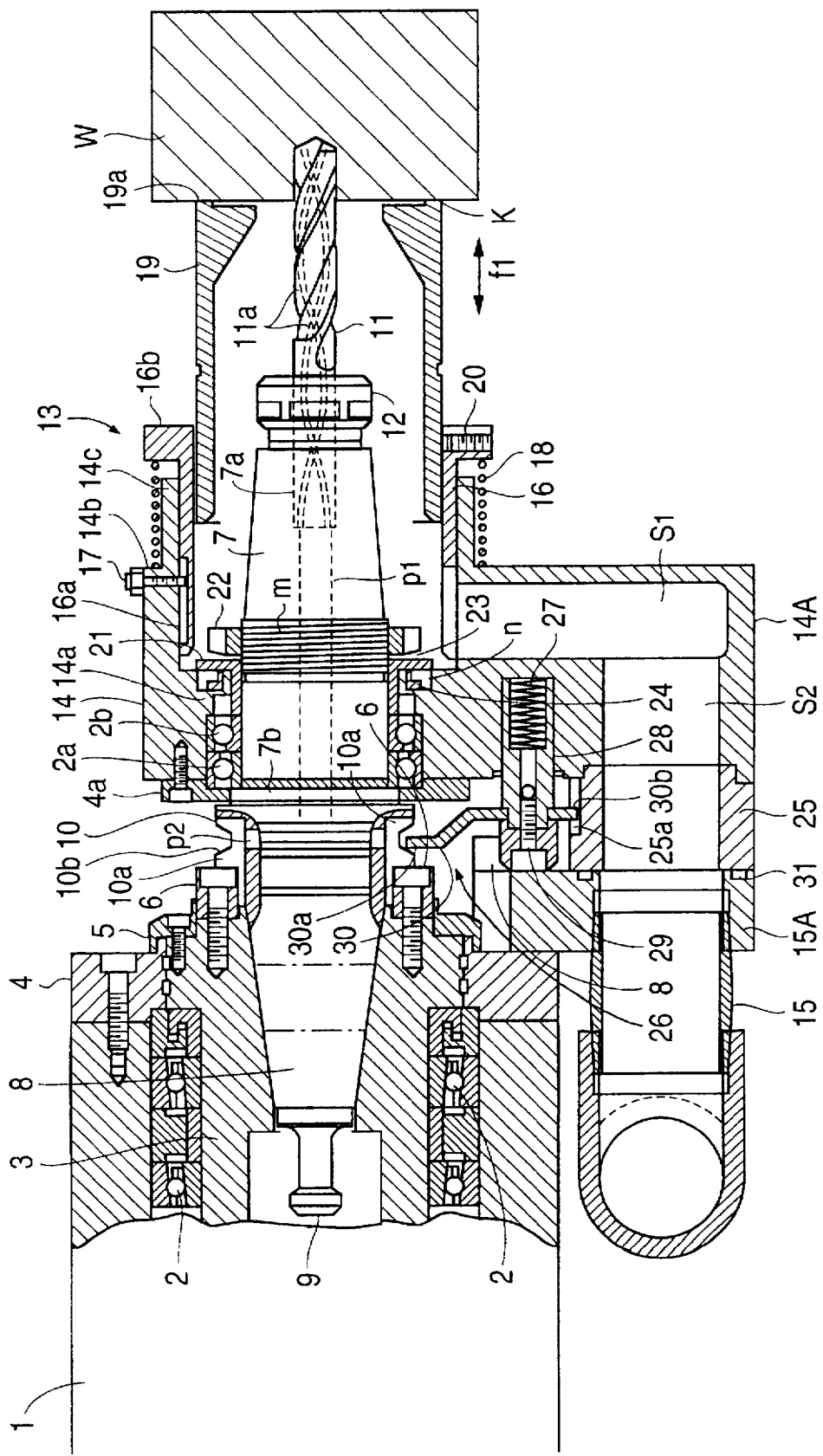
FIG. 1 is a sectional view to describe a part of a processing head for a machine tool having an automatic tool exchanging structure according to an embodiment in the first invention.
Figure 2:
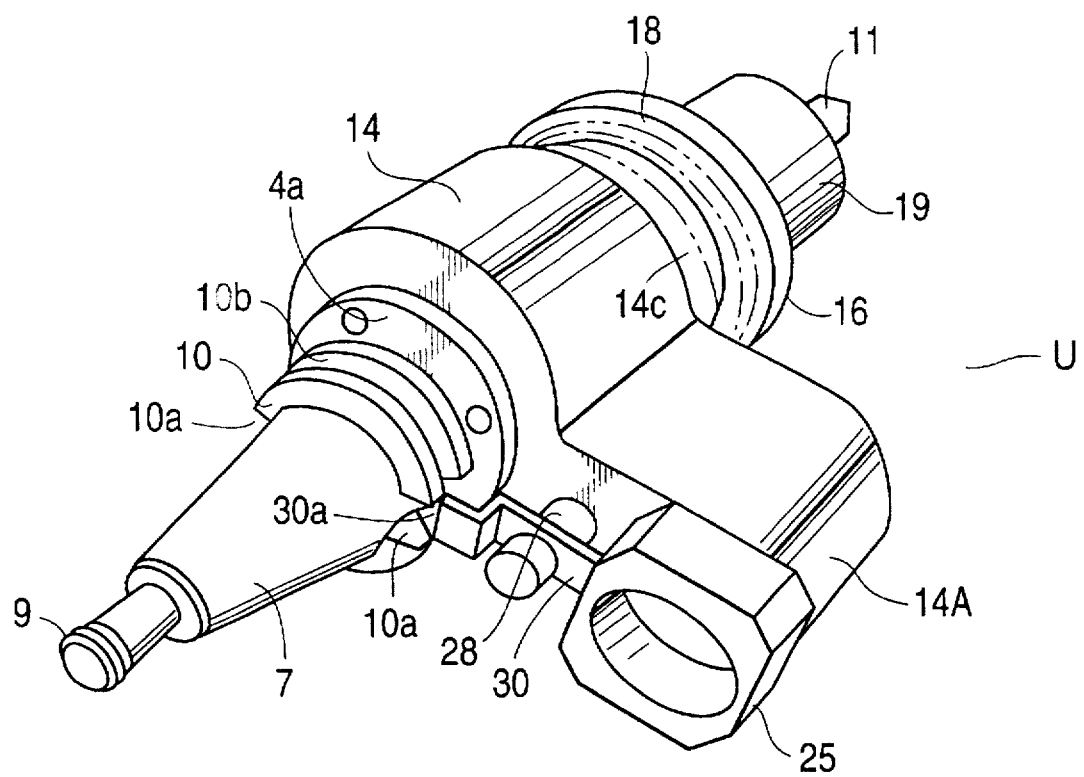
FIG. 2 shows a cutting tool subassembly which can be mounted to and removed from the above processing head.

An embodiment in the first invention is explained with FIGS. 1 and 2.

In FIG. 1, reference number 1 is a spindle supporting member which forms a processing head for a drilling machine. A spindle 3 is provided in an inner hollow of the supporting member 1 by means of ball bearings 2 so as to be rotatably driven at a fixed position. Reference number 4 is a check ring member bolted to the top face of the spindle supporting member 1, 5 is a covering ring member engaged with and bolted to the tip end of a small diameter of the spindle 3, and 6, 6 are two keys for regulating rotations of a blade fixing member 7 (a holder) engaged and fixed to the spindle 3, each key 6 being protrudently fixed to the end surface of the spindle 3 by means of a bolt.

The holder 7 is provided with a taper shank 8 on its base side, said taper shank 8 to be inserted in a hole formed at the center of the spindle 3. A pull stud 9 is provided at the rear end of the shank 8. While the holder 7 is being fixed, the pull stud 9 is engaged with a not-illustrated draw bar, and pulled behing. When taking out the holder 7, the pull stud 9 is pushed on the tip end side of the spindle 3 by the draw bar so as to be released from the engagement with the draw bar.

Around the center part of the holder 7 is provided a key member 10 which comprises concaves 10a, 10a for engaging the two keys 6, 6 at two parts on the end face of the spindle 3 and a circular concave 10b on its circumference.

The tip end of the holder 7 is protrudent, having a center hole 7a for inserting a cutting tool 11 such as a drill, tap, or reamer, and it is provided with a gripping means 12 for holding the base of the cutting tool 11 inserted into the above center hole 7a.

A hooding means 13 made of a rigid material is provided around the cutting tool 11 such as a drill to form an air-tight space thereabout. The specific explanations follow.

A cylindrical metalic hood body member (an outer cylindrical member) 14 is formed to encircle the holder 7. The outer cylindrical member 14 is provided with a partition 14a of a shortened diameter at its middle part on the inner side so as to form a small diameter part 14c.

An inner metalic cylindrical member 16 is slidably inserted into the small diameter part 14c so as to form an air-tight space therein. A thin groove 16a is provided on the outer circumference of the inner cylindrical member 16 along its axtial direction. A guiding screw 17 is screwed and fixed to the circumference of the small diameter part 14c. The tip end of the guiding screw 17 engages in the thin groove 16a so as to regulate circumferential rotations of the inner cylindrical member 16. Thus, the inner cylindrical member 16 is adjustably inserted in the hood body member 14 within the length of the thin groove 16a.

A flanged portion 16b is provided to the tip end of the inner cylindrical member 16. A compressed spring ring 18 is provided on the small diameter part 14c between the flanged portion 16b and the above-described difference 14b so as to push out the inner cylindrical member 16 toward its tip end side with the spring force.

In this case, it is preferable that a metalic cylindrical member 19 for adjusting the protruding length may be slidably inserted into the inner cylindrical member 16, that a fixing screw 20 may be screwed to the circumference of the inner cylindrical member 16, and that positional arrangements of the cylindrical member 19 in a direction f1 can be achieved by handling the fixing screw 20. If necessary, a notch k may be provided on an open end face 19a of the cylindrical member 19 at suitable intervals in its circumferential direction so that the inside of the cylindrical member 19 can communicate with the atmospheric area. A through hole provided on the tip end of the cylindrical member 19 may substitute for the notch k.

The holder 7 is mounted on the outer cylindrical member 14 to be turnable at a fixed position by means of ball bearings 2a, 2b. One end of the ball bearing 2a is stopped by a protruding bar 7a provided in the holder 7, while the other ball bearing 2b is stopped by an end face of a disk member 21 which is mounted on the outside of the holder 7. The other end face of the disk member 21 is clamped by a nut 22 which is engaged with a threaded portion m formed on the outer circumference of the holder 7. Reference number 23 is a washer provided between the disk member 21 and the nut 22. On the front face of the partition 14a is provided a circular groove n on which a seal packing 24 is fit. The seal packing 24 is in touch with the radius directional face of the disk 21 so as to keep an air-tight space under a rotatable condition of the holder 7. Reference number 4a is a stop ring member bolted to the outer cylindrical member 14.

Those are all about a construction of the hooding means 13. Thus, around the cutting tool 11 is formed a shieled space surrounded by the hooding means 13.

It is necessary to provide the air into thus formed space, and therefor an air hole 11a is provided on the cutting tool 11 in its axtial direction. Since the cutting tool 11 shown in this figure is a drill, two air holes 11a are provided in accordance with the spiral of the drill. One end of the air hole 11a is open to the tip end of the cutting tool 11, while the other end is open to the back end thereof.

A passage is provided in the holder 7 so that the back end of the cutting tool 11 is open to the atomospheric area. In this figure, the passage comprises a center hole p1 which communicates with the above air hole 11a and a side hole p2 which communicates with the center hole p1. The side hole p2 is open to the air outside the hooding means 13 at the circular groove 10b.

One part 14A of the outer cylindrical member 14 protrudes in a lateral direction. This protruding part comprises an air duct s1 in a radius direction of the holder 7 and an air duct s2 in an axtial direction of the holder 7. A base member 25 is fixed to the outer end of the air duct s2.

Reference number 26 is an engaging member, wherein a bar member 28, being pushed by a compressed spring 27, is inserted into a hole provided in the outer cylindrical member 14 on the side of the spindle 3 rather than the air duct s2, said bar member 28 being in an axtial direction of the supporting member 1 of the spindle. An engaging member 30 is bolted to the top end of the bar member 28 by means of a cap member 29. The tip end 30a of the engaging member 30 can engage with a groove 10a (used as a concave) provided on the key member 10 in an axial direction of the holder, while the base end 30b of the engaging member 30 engages with a groove 25a provided on the base member 25 in a direction of the spindle 3, thereby carrying out a necessary function in fixing or removing a later-described cutting tool subassembly.

A base member 15A connecting to the air suction pipe 15 is fixed to the stop ring member 4. A packing 31 is fit on the outer end surface of the base member 15A. The packing 31 is to airtightly connect the outer end surface of the base member 25 with the outer end surface of the base member 15A. An engaging groove g is provided at a fixed place on the outer end surface of the base member 15A in a radius direction of the spindle 3. A cap member 29 of the engaging means 26 engages with the engaging groove g.

The holder 7, the hooding means 13, the cutting tool 11, the base member 25 and the engaging means 26, each being independent, are integrally constructed as a cutting tool subassembly U, as shown in FIG. 2.

An explanation follows about a working example and its operation regarding thus constructed invention. A work w is fixed on a not-illustrated working table in advance, and the forward protruding dimention of the cylindrical member 19 is suitably set up by handling the fixing screw 20. Then, the machine tool is put into operation.

When not using the cutting tool subassembly U, it is received inside a assembly is received inside a magazine as a unit. According to necessity, magazine. According to necessity, a tool exchanging arm of an automatic tool exchanging device holds the circular concave groove 10b of the holder 7 so as to move the cutting tool subassembly U suitably. While the cutting tool subassembly U is fixed to the spindle 3, the rotating direction of the holder 7 is regulated to a certain degree, since the holder 7 engages with the tip end 30a of the engaging member 30 and a fixed position (a concave 10a) of the key member 10. Accordingly, the concaves 10a, 10a of the holder 7 accurately face to the keys 6, 6 which stay at a fixed position in the rotating direction due to an orientation function of the spindle 3.

Then, after the cap member 29 moves so as to engage with the engaging groove g, the tool exchanging arm functions so as to push the cutting tool subassembly U to the left side of FIG. 1. Accordingly, the tip end 30a of the engaging member 30 displace together with the cap member 29 relative to the concave 10a of the key member 10, so that they are in a related arrangement as shown in FIG. 1. Then, the holder 7 is released from its rotating regulations so as to be rotatable. At the same time, the holder 7 is fixed to the spindle 3 in connection with withdrawal of a not-illustrated draw 10 bar. At this time, the engagement of the cap member 29 with the engaging groove g regulates rotations of the hooding means 13 around the spindle 3.

At the same time, a joining plane of the base member 25 is in touch with a joining plane of the other base member 15A, so that the air hole s2 is firmly connected with the air suction pipe 15.

After mounting the cutting tool subassembly U on the spindle 3 thus way, processing of the work starts in the following way. At this time, the air inside the hooding means 13 is sucked through the air suction pipe 15 and the air holes s2, s1.

When the spindle 3 moves to the work for a certain amount, the open end face 19a of the cylindrical member 19 touches the work w so as to form a closed space surrounded with the hooding body member 14, the inner cylindrical member 16, the cylindrical member 19 and the disk member 21. Then, in accordance with forward movements of the spindle 3, the inner cylindrical member 16 and the cylindrical member 19 is pushed together into the outer cylindrical member 14 against the elongating force of the spring 18. Under this condition, the free inflow of the air into the hooding means 13 is regulated, while the air in the closed space of the hooding member 13 is sucked through the air suction pipe 15, thereby causing negative pressure therein. Accordingly, the air is forcedly poured into the hooding means 13 through the side hole p2, the center hole p1 and the air hole 11a and then discharged through the air suction pipe 15.

When the spindle 3 moves further, the tip end of the cutting tool 11 touches the surface of the work w and cutting starts. At this time, chips are intensively produced, while the air is intensively poured from the tip end of the cutting tool 11 and sucked into the air suction pipe 15. Accordingly the chips are moved and carried out to a specific place with the air flow.

Even when the cutting tool 11 bores the work deeply, the air is still poured from the tip end of the cutting tool continuously. Accordingly, the flow of the chips is not prevented so that the chips are immediately and smoothly exhausted from the cutting place of the cutting tool 11 to the outside of the work w.

During this processing, the turning force around the spindle 3 is conveyed to the outer cylindrical member 14. This turning force is firmly supported by the bar member 28 which is in a same line with an axtial direction of the supporting member 1 of the spindle, thereby hardly affecting the base member 25 directly. Accordingly, the chips passing through the air hole s2 never affect the joining parts of the base members 25 and 15A.

Besides, the temperature of the cutting tool 11 tends to increase due to the friction heat. However, the air flowing in the air hole 11a effectively cool it, preventing the increase of the temperature.

Depending on constructions of the machine tool or processing conditions of the work, it may be insufficient to pour the air only from the tip end of the cutting tool 11 into the closed space of the hooding means 13. In such a case, the air is poured from the notch k into the closed the closed space of the hooding means 13 for supplement.

Being in touch with the work, the hooding means 13 may be dragged in a direction perpendicular to the spindle 3. In addition, wall surfaces thereof may be intensively struck by keen chips. However, the outer cylindrical member 14, the inner cylindrical member 16 and the cylindrical member 19, all made of rigid material such as metal, can sufficiently resist that.

When the processing is done, the spindle 3 stops at the mounted position again due to an orientation function thereof. Then, the tool exchanging arm removes the cutting tool subassembly from the spindle 3 in reverse order to mounting, and stores it inside the magazine. At this time, the cap member 29 becomes free, and pressure thereof toward the spring 27 is gone, thereby returning the engaging member 30 to the original position with the force of the spring 27. Accordingly, the fixed position of the holder 7 engages with the tip end 30a of the engaging member 30 again thereby regulating the rotating direction of the holder 7 for a certain degree. Then, the holder 7 is to wait for the next mounting to the spindle 3.

According to thus constructed first invention, a machine tool having an automatic tool exchaning structure can automatically fix and remove a cutting tool subassembly without any trouble as well as have the following effects. Namely, the air is poured in the hooding means 13 from the tip end of the cutting tool 11, thereby continuously and smoothly removeing the chips as soon as they are produced with the cutting tool, even in a case of punching a relatively deep hole on the work w. Accordingly, it is especially effective in such a work w as made of an aluminum material whose chips may easily clog the groove of the cutting tool 11. Besides, the air passing through the air hole 11a of the cutting tool 11 affects preventing an increase of the temperature of the cutting tool 11, thereby increasing precision of processing. In addition, since the heated chips are immediately exhausted from the work w, the work w is prevented from being curved due to the heat, thereby still more increasing precision of processing. Moreover, the processed surface is prevented from being damaged by the chips, thereby increasing processing quality. Furthermore, the hooding body member and the cylindrical member made of a rigid material such as metal can function without any trouble even under a sever usage condition.

Figure 3:
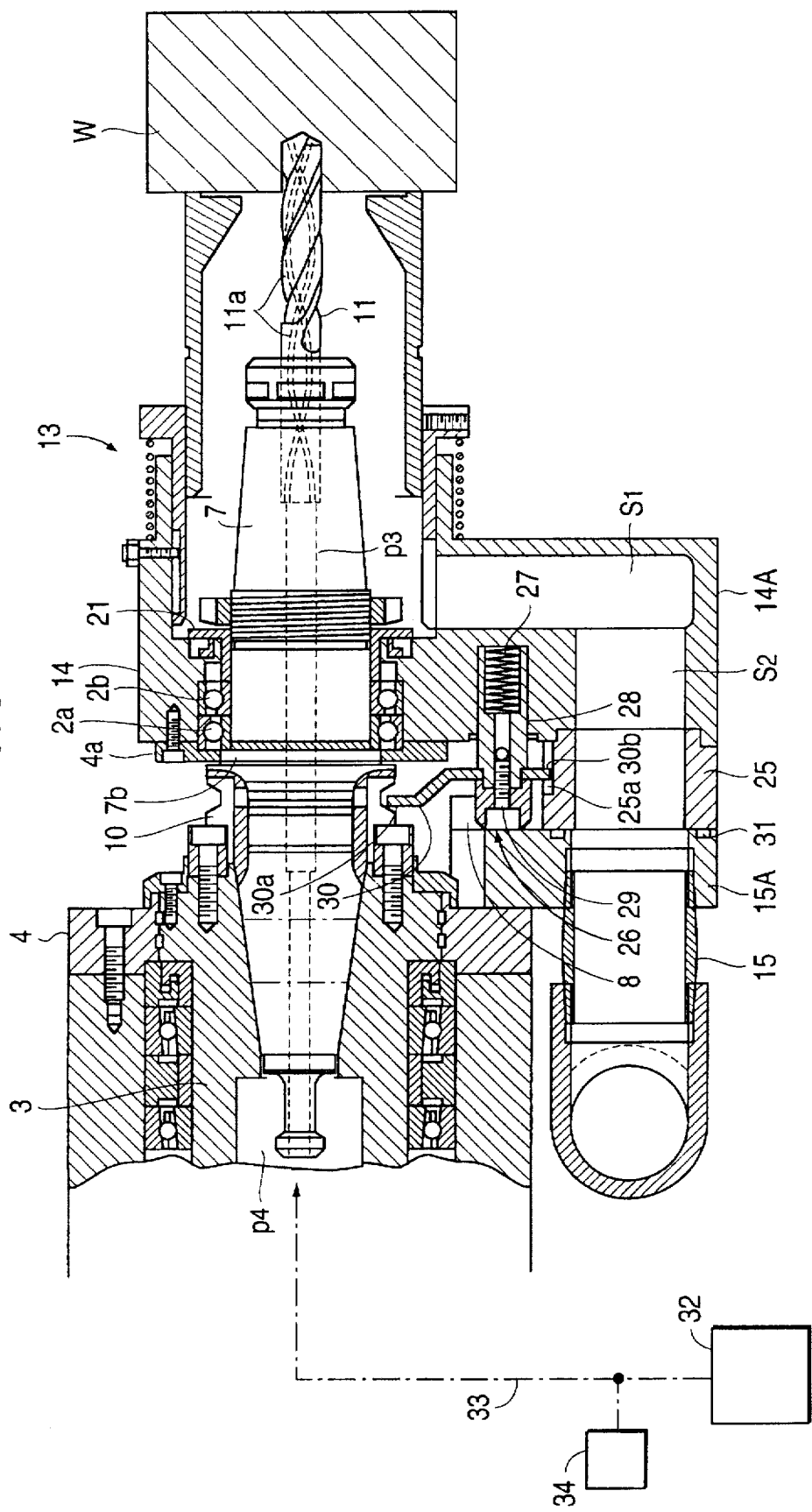
FIG. 3 is a sectional view to describe a part of a processing head for a machine tool having an automatic tool exchanging structure according to an embodiment in the second invention.

Next, an explanation follows about an embodiment in the second invention with FIG. 3. Preference number 32 is a compressed air supply source, 33 is a compressed air supply pipe connecting therefrom, and p3 is a passage provided at the center of the holder 7. One end of the passage p3 is connected to the air hole 11a of the cutting tool 11, while the other end thereof is connected to a center hole p4 of the spindle 3 or an outer compressed air supply pipe 33 by means of a suitable rotating joint.

A lubricant supply device 34, provided on the way of the compressed air supply pipe 33, is for feeding lubricant to the air passing through the compressed air supply pipe 33.

In this embodiment, the way of connecting the passage p3 with the compressed air supply pipe 33 can be modified as follows.

Figure 4:
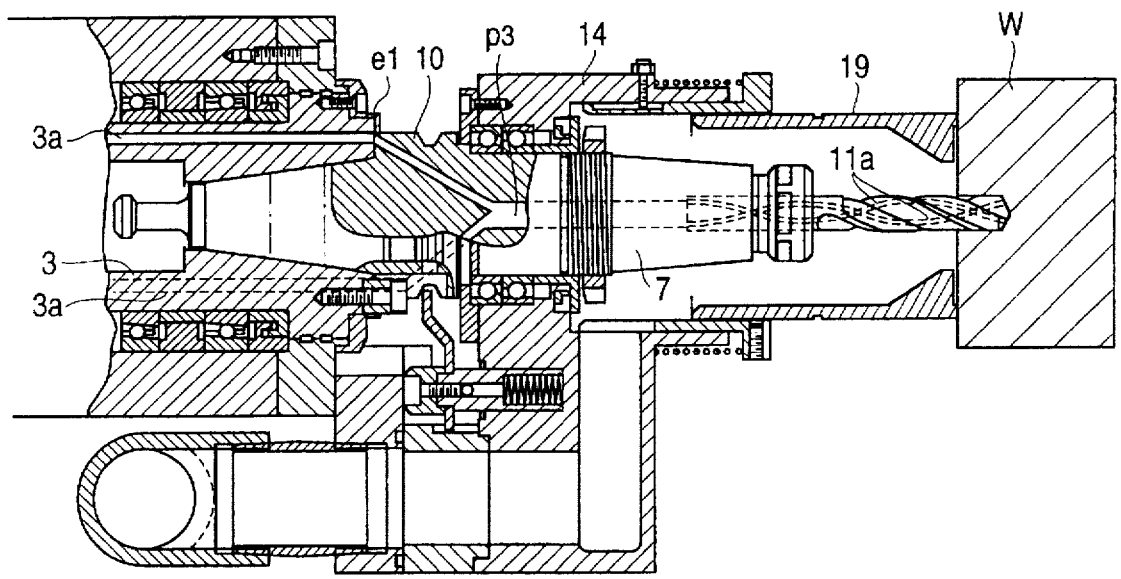
FIGS. 4 and 5 show different forms of the processing head shown in FIG. 3.

Namely, as shown in FIG. 4, the end part of the center hole p3 on the spindle 3 side is slantwise devided, and open to the end face of the key member 10. The opening may be connected close to a tip opening e1 of a passage 3a provided on a thick part of the spindle 3, and the upper part of the passage 3a may be connected to the compressed air supply pipe 33 by means of a suitable rotating joint.

Figure 5:
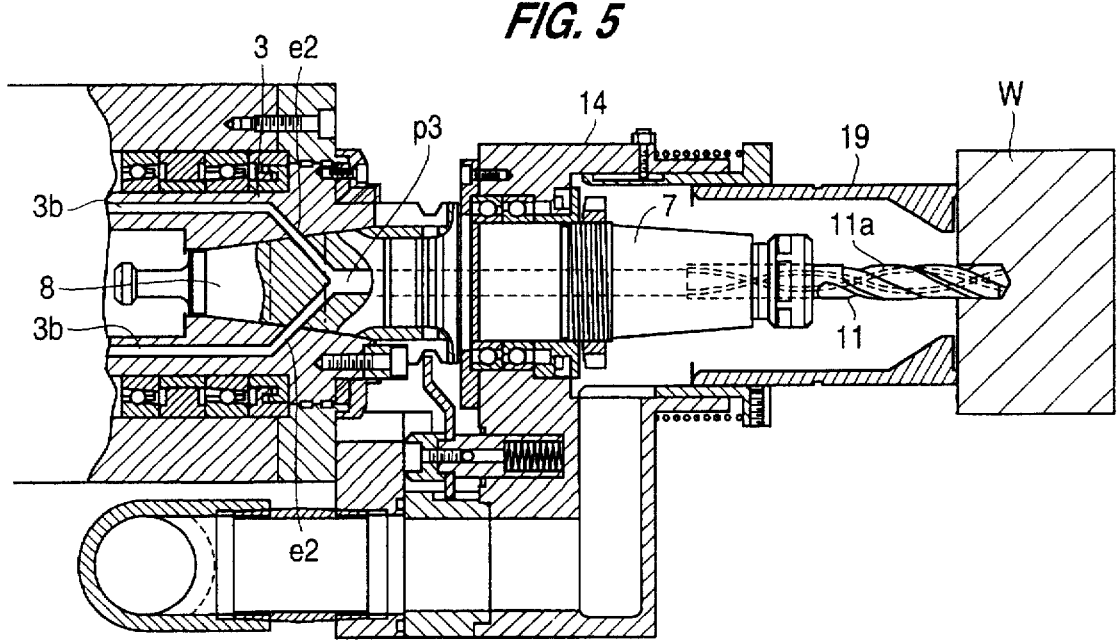

Or, as shown in FIG. 5, the end part of the center hole p3 on the spindle 3 side is slantwise devided, and open to the circumferential side face of the taper shank 8. Then, the opening may be connected close to a tip opening e2 of the passage 3b provided on a thick part of the spindle 3.

The device according to this embodiment is in use according to the first invention. The following is an explanation peculiar to the device in this invention. In FIG. 3, during processing the work w, the compressed air including misty lubricant is supplied from the compressed air supply pipe 33 to the air hole 11a. At the same time, the air inside the hooding means 13 is continuously sucked through the air suction pipe 15.

According to this structure, the compressed air jets from the tip end of the cutting tool 11 and flows in a fixed direction in connection with sucking function of the air suction pipe 15. This intensive flow of the compressed air can cool the chips actively as well as carry them into the hooding means 13 immediately and certainly. The lubricant fed to the compressed air by the lubricant supply device 34 is carried to an actuating part of the cutting tool 11 to lubricate it entirely.

According to thus constructed second invention, the machine tool having an automatic tool exchanging structure can automatically fix and remove the cutting tool subassembly without any trouble, and carry out the chips smoothly by the air suction during processing because no outer force affects the air duct s2 directly, like the first invention. Besides, it has the following effects. Namely, since the compressed air jets from the tip end of the cutting tool 11 intensively, it can enjoy the same effects as the first invention more strongly and certainly. Especially, the compressed air which expands right after jetting from the air hole 11a can cool the heat of the cutting tool 11 powerfully so as to extend the life of the cutting tool. Moreover, if a cutting fluid supply device 34 is provided, the cutting tool 11, lubricated by the cutting fluid, is strongly prevented from being damaged and transformed due to the heat.

In all figures described in the above, the same reference numbers are given to the same parts.

I claim:

1. A chip suction and disposal device for a machine tool having an automatic tool exchanging structure, wherein a cutting tool subassembly (U) is fit to and removed from a spindle;

wherein a hooding means (13) is provided to form an air-tight space around a cutting tool mounted on the tip end of a cutting tool mounting member (7);

wherein cylindrical members (16, 19), parts of the hooding member, are retreatable and slidable relative to a work against spring (18) force toward the tip end of the cutting tool;

wherein an opening is provided on the tip end face of the cylindrical members, said tip end to be in touch with the work;

wherein air ducts (s1, s2) are provided to suck the air inside the hooding means;

wherein an air hole (11a) is provided in a shaft of the cutting tool;

wherein one end of the air hole is open to the tip end of the cutting tool, while the other end is connected to passages (p1, p2), said passages being open to the atmospheric area at the cutting tool mounting member (7);

wherein a connecting opening for said air ducts (s1, s2) is provided on the end face of the hooding means on its spindle side;

wherein an engaging means (26) is provided to regulate rotations of the cutting tool mounting member (7) to a fixed position;

wherein said engaging means (26) is provided to protrude by means of a bar member (28) which is engaged with the spindle supporting member (1) in a same body;

wherein rotating regulation of the cutting tool mounting member (7) is released by pushing movement of the bar member (28) against spring (27) force; and wherein an air suction pipe (15) is provided near the spindle supporting member (1) so as to closely connect the end face of a connecting opening of said air suction pipe (15) with the end face of said connecting opening of the air ducts (s1, s2).

2. A chip suction and disposal device for a machine tool having an automatic tool exchanging structure, wherein a cutting tool subassembly (U) is fit to and removed from a spindle;

wherein a hooding means (13) is provided to form an air-tight space around a cutting tool mounted on the tip end of a cutting tool mounting member (7);

wherein cylindrical members (16, 19), parts of the hooding member, are retreatable and slidable relative to a work against spring (18) force toward the tip end of the cutting tool;

wherein an opening is provided on the tip end face of the cylindrical members, said tip end to be in touch with the work;

wherein air ducts (s1, s2) are provided to suck the air inside the hooding means;

wherein an air hole (11a) is provided in a shaft of the cutting tool;

wherein one end of the air hole is open to the tip end of the cutting tool, while the other end is connected to an outer compressed air supply pipe (33) by means of passages (p1, p2) provided on the cutting tool mounting member (7);

wherein an opening for connecting said air ducts (s1, s2) is provided on the end face of the hooding means on its spindle side;

wherein an engaging means (26) is provided to regulate rotations of the cutting tool mounting member (7) to a fixed position;

wherein the engaging means (26) comprises a bar member (28) which is independently provided on the end face of the hooding means on its spindle side nearer the cutting tool mounting member (7) than the center line of the air duct (s2), said bar member being in an axial direction of the spindle supporting member (1);

wherein the bar member (28) is given the pushing force for individual movement by a spring (27); and wherein an air suction pipe (15) is provided near the spindle supporting member (1) so as to closely connect the end face of a connecting opening of said air suction pipe (15) with the end face of said connecting opening of the air ducts (s1, s2).

3. A chip suction and disposal device for a machine tool having an automatic tool exchanging structure according to claim 2, wherein a cutting fluid supply device (34) is provided for feeding misty cutting fluid into the compressed air in the air hole (11a) supplied from the compressed air supply pipe (33).

4. A chip suction and disposal device for a machine tool having an automatic tool exchanging structure according to claim 1, wherein the cylindrical members (16, 19) are made of a rigid material metal.

5. A chip suction and disposal device for a machine tool having an automatic tool exchanging structure according to claim 1, wherein a notch (k) is provided on the tip end face of the cylindrical member (19) made of a rigid material metal; or wherein a through hole is provided on the tip end of the cylindrical member (19) instead.

6. A chip suction and disposal device for a machine tool having an automatic tool exchanging structure according to claim 2, wherein the cylindrical members (16, 19) are made of a rigid material metal.

7. A chip suction and disposal device for a machine tool having an automatic tool exchanging structure according to claim 3, wherein the cylindrical members (16, 19) are made of a rigid material metal.

8. A chip suction and disposal device for a machine tool having an automatic tool exchanging structure according to claim 2, wherein a notch (k) is provided on the tip end face of the cylindrical member (19) made of a rigid material metal; or wherein a through hole is provided on the tip end of the cylindrical member (19) instead.

9. A chip suction and disposal device for a machine tool having an automatic tool exchanging structure according to claim 3, wherein a notch (k) is provided on the tip end face of the cylindrical member (19) made of a rigid material metal; or wherein a through hole is provided on the tip end of the cylindrical member (19) instead.

10. A chip suction and disposal device for a machine tool having an automatic tool exchanging structure according to any one of claims 4–9, wherein the rigid material is metal.

* * * * *